United States Patent [19]
Henderson

[11] Patent Number: 4,874,961
[45] Date of Patent: Oct. 17, 1989

[54] ELECTRICAL POWER GENERATING SYSTEM HAVING PARALLEL GENERATOR CONTROL

[75] Inventor: Eric A. Henderson, Rockford, Ill.

[73] Assignee: Sundstrand Corporation, Rockford, Ill.

[21] Appl. No.: 264,886

[22] Filed: Oct. 31, 1988

[51] Int. Cl.$^4$ ............................................. H02J 1/10
[52] U.S. Cl. ...................................... 307/87; 307/85
[58] Field of Search ...................... 307/87, 84, 153, 57, 307/85; 322/32, 29, 20, 24, 22; 318/85, 149

[56] References Cited

U.S. PATENT DOCUMENTS

| | | | |
|---|---|---|---|
| 3,832,713 | 8/1974 | Rubin | 343/100 SA |
| 3,887,820 | 6/1975 | Glennon | 307/87 |
| 4,231,029 | 10/1980 | Johnston | 307/87 X |
| 4,260,947 | 4/1981 | Massey | 323/322 |
| 4,308,465 | 12/1981 | Lafuze | 307/87 |
| 4,598,257 | 7/1986 | Southard | 331/2 |
| 4,707,142 | 11/1987 | Baker et al. | 307/87 X |
| 4,728,806 | 3/1988 | Baker et al. | 307/87 X |
| 4,754,161 | 6/1988 | Fox | 307/87 |

Primary Examiner—William M. Shoop, Jr.
Assistant Examiner—Sharon D. Logan
Attorney, Agent, or Firm—Antonelli, Terry & Wands

[57] ABSTRACT

A power generation system (40), (120), is disclosed in which the phase and frequency of alternating current generated by one or more generators (14) is locked to the phase of alternating current generated by a master generator (12) or to an external power source (124). A master control unit (42), (122) contains a master count generator (52) which generates a synchronization count which is transmitted to each generator control unit (44). The synchronization count at any point in time of the master count generator is directly proportional to the phase of electrical current being generated by the master generator or the external power source. Each generator control unit (44) receives the synchronization count and compares the synchronization count with a locally generated synchronization count which is proportional to the phase of electrical current being generated by a generator controlled by the generator control unit receiving the synchronization count. The phase of the alternating current generated by the generators controlled by the each generator control unit receiving the synchronization count is adjusted as a function of the difference of the received and locally generated synchronization count to lock the phase and frequency of the alternating current with the phase and frequency of alternating current generated by the master generator or the phase and frequency of the external, power source.

51 Claims, 8 Drawing Sheets

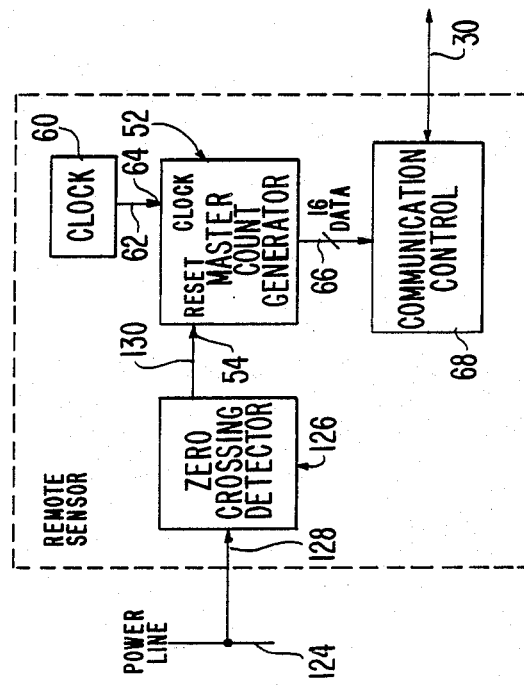
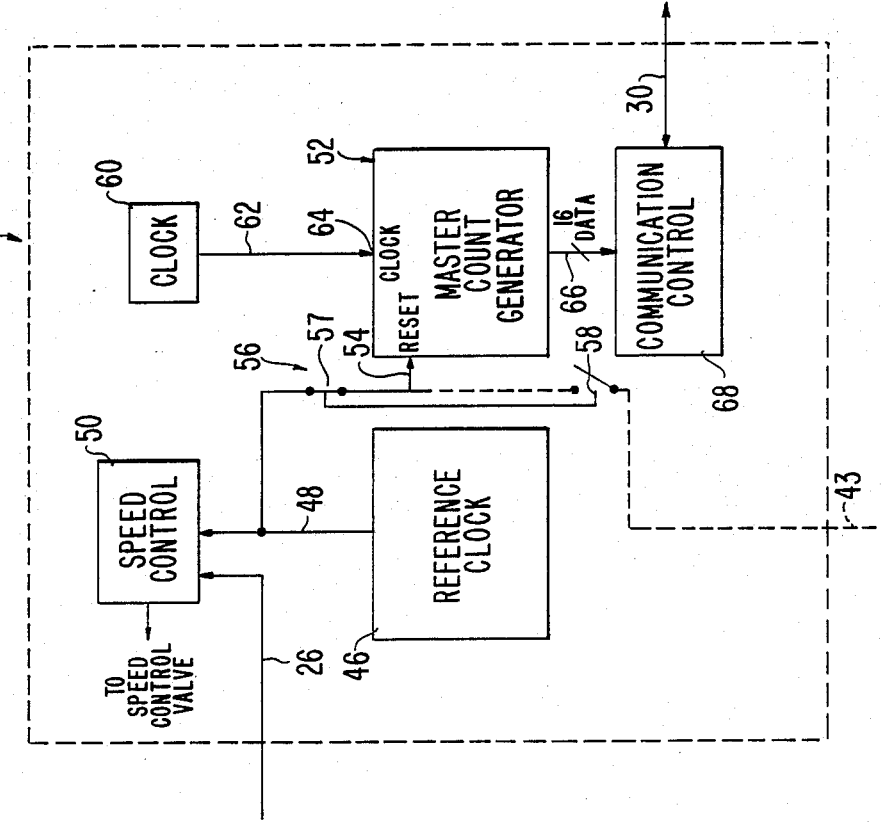

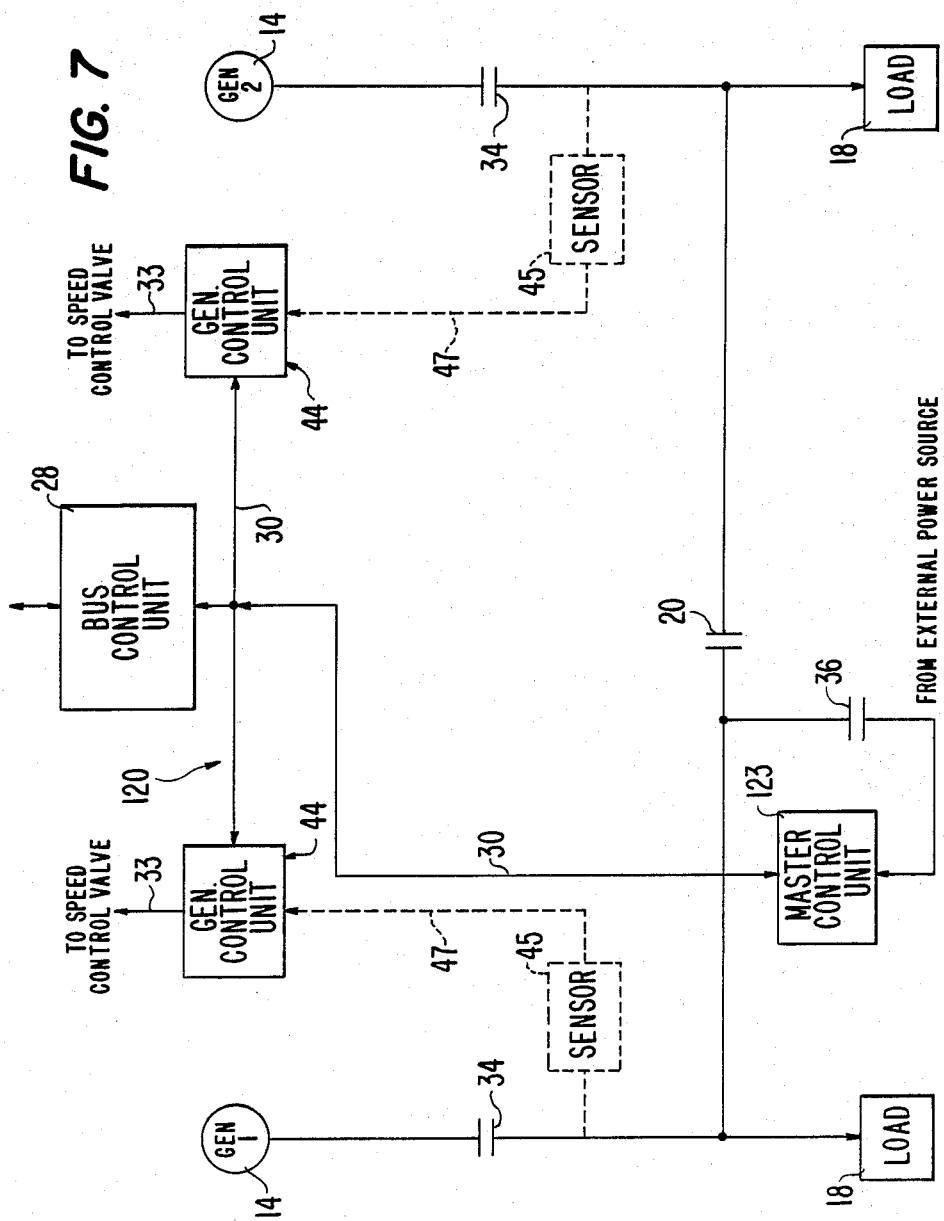

ELECTRICAL POWER GENERATING SYSTEM HAVING PARALLEL GENERATOR CONTROL

TECHNICAL FIELD

The present invention relates to electrical power generating systems in which alternating current generated by one or more controlled generators is locked in at least phase and preferably in phase and frequency to alternating current generated by a master generator or to a source of alternating current generated external to the generating system. More particularly, the present invention relates to generating systems of the foregoing type which are used in airframes.

BACKGROUND ART

FIG. 1 illustrates an electrical power generating system 10 which has been marketed by the assignee for use in airframes. A plurality of engines, not illustrated, each provide shaft power for driving a three phase alternator which is driven at a constant speed to produce 400 Hz electrical power. The alternator may be driven by a separate constant speed drive (CSD) which has a variable velocity input shaft driven by an aircraft engine and a constant velocity output shaft which drives the three phase alternator or is contained within an integrated drive generator (IDG) which contains a constant speed drive transmission having a variable speed input shaft from the aircraft engine and a constant speed output shaft which drives the three phase alternator. As illustrated in FIG. 1, a plurality of the aforementioned three phase alternators 12 and 14 are provided with it being understood that additional alternators have been used in the prior art. The aforementioned CSD or IDG units have been omitted from the drawing with it being understood that the output 32 labelled "To Speed Control Valve" is an output to a conventional control within an aforementioned CSD or IDG. Each of the alternators 12 and 14 are respectively connected to a power bus 16 to which any number of electrical loads 18 are connected. Because of the common connection of the generators 12 and 14 together through contactor 20 within power bus 16, it is necessary to precisely control the phase and frequency of the alternating current generated by each of the alternators 12 and 14 so that each of the electrical phases produced by generators 12 and 14 are precisely locked in phase and frequency. Generator 12 may function as a master generator which generates alternating current to which alternating current generated by each of the at least one slave generators 14 is phase locked. Alternatively, each of the generators 12 and 14 may function as a slave generator which generates alternating current phase and frequency locked to alternating current generated by an external power source. The bus contactor 20 permits the generators 12 and 14 to be either operated in parallel when the contactor is closed or isolated from each other when the contactor is open. Generator 12 has an associated generator control unit 20 which controls the output shaft velocity of the CSD or IDG by the output 32 to cause electrical current of precisely 400 Hz to be generated. The aforementioned control is conventional. As illustrated, the generator control unit 20 functions as a master unit which provides the reference phase signal over lines 24 to which the generator 14 is phase locked. Generator control unit 22 controls the operation of slave generator 14 in a manner analogous to the control of generator 12 by generator control unit 20. Phase and frequency locking of generator 14 to generator 12 is achieved by the transmission of an analog synchronization signal on the pair of synchronization lines 24 which transmit frequency and phase information for phase locking the generator 14 to the generator 12. In order to insure the highest reliability, an additional pair of lines may be provided which connect the master generator control unit 20 to the slave generator control unit 22 to prevent loss of phase locking by failure of the lines 24. Whichever generator control unit 20 or 22 is assigned the master function also has the functional capability of receiving a signal from an external power source on line 38 to phase lock the alternating current generated by the generators 12 and 14 to a phase of the alternating current generated by the external source. Bus control unit 28 controls the transmission of multiple communications between the generator control units 20 and 22 over serial communication bus 30 in a time multiplexed manner with the aforementioned communications being conventional and forming no part of the present invention. Each of the generator control units 20 and 22 respectively have outputs 32 which are signals respectively applied to a servo-valve control of the aforementioned IDG or CSD controlling the rotational velocity of the shaft driving the generators 12 and 14 to control the frequency of the three-phase alternating current precisely. Load contactors 34 permit the generators 12 and 14 to be respectively disconnected from the loads 18. Contactor 36 permits the power bus 16 to be disconnected from the external power source. Either generator control unit 20 or 22 which is connected to the external power on line 38 provides external phase synchronization information to the other generator control unit by lines 24. As illustrated, the generator control unit 20 is configured to receive an external power source phase reference on line 38 to phase lock both generators 12 and 14 to the external power and alternatively to function as a master control unit when an external power source phase reference is disconnected. Furthermore, independent synchronization of generators 12 and 14, which are not connected in parallel, is useful to avoid beat frequencies.

U.S. Pat. No. 4,308,465 discloses an electrical power generating system having plural electrical power generators operated in parallel which locks the generators in frequency to the average of all of the natural frequencies of the individual generators.

Phase synchronization problems are exacerbated when phase locked generators are physically separated by distances of hundreds of feet of power line such as could occur in a space station.

DISCLOSURE OF THE INVENTION

The present invention provides a phase synchronization system for precisely locking the phase and preferably phase and frequency of alternating current generated by one or more electrical generators to the phase of alternating current generated by a master alternating current generator or to alternating current generated by a source external to the generating system. With the invention, if the master or external source is generating current precisely at the same frequency as the generators which are locked t the master generator or external source phase control is achieved by a differential (small) change of frequency of the locked generators to bring the generated current into precise phase locking. This control is referred to herein as phase control. Phase and frequency control as used herein describes the variation of the phase and frequency of the locked generators to follow phase and frequency variations of the master or external source.

Both of the aforementioned embodiments utilize a control unit having a master count generator for generating a time varying synchronization count varying from a minimum to a maximum during each cycle of alternating current generated by a master generator or during each cycle of alternating current generated external to the alternating current generating system with the synchronization count being proportional at any time during a cycle of the alternating current to a phase of electrical current being generated by the master generator with respect to a time reference or the alternating current generated external to the generating system with respect to a time reference. In both embodiments of the invention, the synchronization count generated by the master generator control unit is transmitted to at least one generator control unit which each control an associated generator to lock at least the phase of the alternating current generated by the associated generators to the phase information contained in the synchronization count. Each of the generator control units which receive the synchronization count transmitted from the master generator control unit have a count generator which generates a time varying synchronization count varying from the same minimum to the maximum as the synchronization count of the master generator control unit during each cycle of the alternating current generated by the associated generator with the synchronization count of each count generator at any time during a cycle of alternating current generated by the associated generator controlled by the generator control unit being proportional to the phase of the generated alternating current with respect to a time reference. Each of the generator control units has a count comparator for comparing a received synchronization count with a current synchronization count of the generator control unit and adjusting at least the phase of alternating current generated by the generator controlled by the generator control unit as a function of a difference between the received synchronization count and the count generated by the generator control unit to cause the alternating current generated by the generator to be locked at least in phase with alternating current generated external to the system or generated by a master generator unit.

The present invention is based upon the fact that precise frequency and phase synchronization may be maintained between one or more controlled generators and a master generator or alternating current generated external to the generating system by transmitting numerically encoded phase information from a master control unit to generator control units of controlled generators with the numerically encoded phase synchronization information transmitted from the master control unit and the phase synchronization information generated by the control units of the controlled generators each being generated by a counter counting an identical predetermined count over a cycle of alternating current respectively of the master generator or external source and the controlled generators. The difference between the counts of the counters at any point in time is proportional to the phase error between alternating current generated external to the system or alternating current generated by a master generator and the alternating current generated by the controlled generator units.

An alternating current generating system having at least one slave generator with each slave generator being controlled by an associated slave generator control unit with alternating current generated by each slave generator being locked in at least phase to alternating current generated by a master generator controlled by a master generator control unit in accordance with the invention wherein the master generator control unit includes a master count generator for generating a master synchronization count varying from a minimum to a maximum during each cycle of the alternating current generated by the master generator with the synchronization count being proportional at any time during the cycle of the generated alternating current to a phase of alternating current being generated by the master generator with respect to a time reference; each of the slave generator control units includes a slave count generator, each slave count generator generating a slave synchronization count varying from the minimum to the maximum during each cycle of the alternating current generated by the slave generator controlled by the slave generator control unit with the slave synchronization count of each slave generator at any time during a cycle of alternating current generated by the slave generator controlled by the slave generator control unit being proportional to a phase of the generated alternating current with respect to a time reference; a transmission system is coupled to the master generator control unit and each of the slave generator control units for periodically sending the synchronization count from the master generator control unit to each slave generator control unit; each slave generator control unit has a processor for generating a correction count which is a function of a difference between the compared synchronization counts; and each slave generator control unit has a controller for adjusting at least the phase of the alternating current generated by the slave generator controlled by the slave generator control unit as a function of the correction count. Furthermore, the frequency of the alternating current generated by each of the slave generators is locked to the frequency of the master or external source. Furthermore, each slave generator control unit adjusts the frequency of the electrical current generated by slave generator to the frequency of the master generator. The correction count comprises the synchronization count received from the master control unit less the sum of a current count of the slave count generator and a compensation count. The compensation count is a function of one or more of the delay of the master generator control unit in providing the synchronization count of the master count generator to the transmission system for transmission to the slave generator control unit, delay of the transmission system in transmitting the synchronization count of the master count generator to the slave generator control unit and delay of the slave generator control unit in receiving the synchronization count of the master count generator and generating the correction count. The transmission system periodically transmits the synchronization count of the master count generator to each of the slave generator control units asynchronously with respect to the frequency of current generated by the master generator. The transmission system comprises a serial communication bus coupling the master generator control unit to each slave generator control unit and a bus control unit controlling transmission of communications between the master generator control unit and each slave generator control unit. The bus control unit asynchronously, with respect to the frequency of current generated by the master generator, samples the synchronization count of the master count generator and causes transmission of the sampled synchronization count to each slave generator control unit on the serial communication bus. The bus control unit time multiplexes the transmission of the sampled synchronization count from the master generator control unit to each slave generator control unit over the serial communication bus with transmission of other communications between the master generator control unit and each slave generator control unit over the serial communication bus.

The master generator control unit comprises a reference clock for producing on an output pulses defining the period of each cycle of the alternating current produced by the master generator; a counter having a reset input and a clock input which counts a predetermined count of pulses received on the clock input and an output which outputs the synchronization count of the counter; a clock having an output coupled to the clock input of the counter for producing pulses on the output which are counted by the counter having a frequency higher than the frequency of the alternating current generated by the master generator; the output of the reference clock being connected to the reset input of the counter; and a gate, coupled to the output of the counter, for applying the synchronization count of the counter to the transmission system in response to a control signal. The output pulses from the reference clock are applied to a frequency control which controls the frequency of the alternating current produced by the master generator.

Each slave generator control unit comprises a receiver for receiving the synchronization count transmitted from the master generator control unit and for generating an interrupt pulse in response to receipt of the synchronization count; the slave count generator having an input to which is applied the interrupt pulse to sample the count of the slave count generator, a clock input to which is applied clock pulses which are counted by the count generator, the pulses having a frequency higher than the frequency of the alternating current generated by the slave generator; and a reset input which is the time reference and an output which is the synchronization count of the count generator.

The time reference of the master count generator may be produced by a reference clock which controls the frequency of alternating current generated by the master generator and resetting of the master count generator or is derived from the alternating current generated by the master generator and the time reference of each of the slave count generators may be a reference clock which controls the frequency of alternating current generated by the slave generator and resetting of the slave count generator or is derived from the alternating current generated by the master generator. Each source of time reference in the master count generator and the slave count generator may be used with equal facility.

An alternating current generating system having at least one alternating current generator with each alternating current generator generating alternating current locked at least in phase to alternating current generated external to the system in accordance with the invention comprises an input for receiving the alternating current generated external to the system; a master generator control unit, responsive to the alternating current external to the system, having a master count generator for generating a synchronization count varying from a minimum to a maximum during each cycle of the alternating current external to the system with the synchronization count being proportional at any time during the cycle of the alternating current external to the system to a phase of the alternating current external to the system with respect to a time reference; a generator control unit associated with each of the alternating current generators, each generator control unit having a count generator, each count generator of a generator control unit generating a synchronization count varying from the minimum to the maximum during each cycle of the alternating current generated by the generator controlled by the associated generator control unit with the synchronization count of each count generator of a generator control unit at any time during a cycle of alternating current generated by the associated generator being proportional to the phase of the generated alternating current with respect to time reference; a transmission system coupled to the master generator control unit and each generator control unit for periodically sending the synchronization count from the master count generator to each generator control unit; and wherein each generator control unit has a processor for generating a correction count which is a function of a difference between the compared counts; and each generator control unit has a controller for adjusting at least the phase of the electrical current generate by the generator controlled by the generator control unit as a function of the correction count. The frequency of the alternating current generated by each of the alternating current generators is locked to the frequency of the alternating current external to the system. Each generator control unit adjusts the frequency of the electrical current generated by the generator to the frequency of the external source. The correction count comprises the synchronization count received by the master control unit less the sum of the synchronization count of the generator control unit associated with a generator generating alternating current and a compensation count; and the compensation count is a function of one or more of delay of the master generator control unit in providing the synchronization count of the master count generator to the transmission system for transmission to the generator control unit, delay of the transmission system in transmitting the synchronization count of the master count generator to the generator control unit, and delay of the generator control unit in receiving the synchronization count of the master generator and generating the correction count. The transmission system periodically transmits the synchronization count of the master count generator asynchronously with respect to the frequency of the alternating current generated external to the system. The transmission system comprises a serial communication bus coupling the master generator control unit to each of the generator control units; and a bus control unit controlling transmission of communications between the master generator control unit and each generator control unit, the bus control unit asynchronously with respect to the frequency of alternating current generated exterior to the system sampling the synchronization count of the master count generator and causing transmission of the sampled synchronization count to each generator control unit on the serial communication bus. The bus control unit time multiplexes the transmission of the sampled current synchronization count from the master generator control unit to each generator control unit over the serial communication bus with transmission of other communications between the master generator control unit and each generator control unit over the serial communication bs. The time reference of the master count generator is derived from the alternating current generated external to the system. The time reference of each count generator of the generator control unit associated with the generator is produced by a reference clock which controls the frequency of alternating current generated by the generator and resetting of the count generator or is derived from the alternating current generated by the associated generator.

In an alternating current generating system having at least one slave generator with each slave generator being controlled by an associated slave generator control unit with alternating current generated by each slave generator being locked at least in phase to alternating current generated by a master generator controlled by a master generator control unit, the master generator control unit in accordance with the invention comprises a master count generator for generating a synchronization count varying from a minimum to a maximum during each cycle of alternating current generated by the master generator with the synchronization count being proportional at any time during a cycle of the generated alternating current to a phase of electrical current being generated by the master generator with respect to a time reference; and a source for generating the time reference. Each slave generator control unit adjusts the frequency of the electrical current generated by the slave generator to the frequency of the alternating current generated by the master generator. The frequency of the alternating current generated by each of the slave generators is locked to the frequency of the alternating current generated by the master generator. The source for generating the time reference is a reference clock for producing output pulses on an output to the master count generator defining each cycle of the alternating current produced by the master generator with the clock pulses also being applied to a frequency control which controls the frequency of the alternating current produced by the master generator.

In an alternating current generating system having at least one slave generator with each slave generator being controlled by an associated slave generator control unit with alternating current generated by each slave generator being locked at least in phase to alternating current generated by a master generator controlled by a master generator control unit, each slave generator in accordance with the invention comprising a slave count generator for generating a synchronization count varying from a minimum to a maximum during each cycle of alternating current generated by the associated slave generator with the synchronization count of each slave count generator at any time during a cycle of alternating current generated by the associated slave generator being proportional to a phase of the generated alternating current with respect to a time reference; and a source for generating the time reference. The frequency of the alternating current generated by each of the slave generators is locked to the frequency of the alternating current generated by the master generator. Each slave generator control unit adjusts the frequency of the electrical current generated by the slave generator to the frequency of the alternating current generated by the master generator. The slave generator control unit further comprises a receiver for receiving a synchronization count transmitted from the master generator control unit which varies from a minimum to a maximum during each cycle of alternating current generated by the master generator with the synchronization count being proportional at any time during a cycle of the generated alternating current to a phase of electrical current being generated by the master generator with respect to a time reference and for generating an interrupt pulse in response to receipt of the synchronization count; and an enable input to which is applied the interrupt pulse to sample the synchronization count of the slave count generator, a clock input to which is applied clock pulses which are counted by the count generator, the pulses having a frequency higher than a frequency of the alternating current generated by the slave generator; and wherein each slave generator control unit has a processor for generating a correction count which is a function of a difference between the compared synchronization counts; and each slave generator control unit has a controller for adjusting at least the phase of the electrical current generated by the slave generator controlled by the slave generator control unit as a function of the correction count. Furthermore, each slave generator control unit adjusts the frequency of the electrical current generated by slave generator to the frequency of the master generator.

A method of locking at least the phase of alternating current generated by at least one slave generator to alternating current generated by a master generator in accordance with the invention comprises periodically transmitting a synchronization count from a master generator control unit controlling the master generator to at least one slave generator control unit with each slave generator being controlled by a slave generator control unit, the synchronization count being proportional to a phase of the alternating current being generated by the master generator with respect to a time reference and cyclically varying between a minimum and a maximum over each cycle of alternating current generated by the master generator; each slave generator control unit generating a synchronization count which varies between the minimum and the maximum over each period of a cycle of alternating current generated by the slave generator controlled by the slave generator control unit; and each generator control unit generating a correction count which is a function of a difference between the received synchronization count and a synchronization count generated by the slave generator control unit and adjusting at least the phase of alternating current generated by the slave generator controlled by the slave generator control unit as a function of the correction count to cause the alternating current generated by the master and the at least one slave generator control unit to be locked at least in phase. Furthermore, the frequency of the current generated by the master and slave generators is locked. The periodic transmission of the synchronization count from the master control unit to each slave generator control unit is asynchronous with respect to the frequency of the current generated by the master generator. The correction count comprises the synchronization count received from the master control unit, less the sum of a synchronization count of the slave count generator and a compensation count; and the compensation count is a function of at least one of a delay of the master generator control unit in providing the synchronization count of the master count generator to the transmission system for transmission to the slave generator control unit, delay of the transmission system in transmitting the synchronization count of the master count generator to the generator control unit, and delay of the slave generator unit in receiving the synchronization count of the master count generator and generating the correction count.

A method of at least phase locking alternating current generated by each of at least one alternating current generator, with each generator having an associated generator control unit for controlling the generator, to alternating current generated external to a generating system in accordance with the invention comprises periodically transmitting a synchronization count from a master control unit to each of the generator control units in the system with the synchronization count varying from a minimum to a maximum during each cycle of the alternating current generated external to the generating system and being proportional to a phase of the alternating current generated external to the system with respect to a time reference; each generator control unit associated with a generator generating a synchronization count which varies between the minimum and the maximum over each period of a cycle of alternating current generated by the generator controlled by the associated generator control unit; and each generator control unit associated with a generator adjusting at least the phase of alternating current generated by the generator as a function of a difference between the received synchronization count and the synchronization count generated by the generator control unit to cause the alternating current generated by the generator to be locked at least in phase to the alternating current generated external to the generating system. Furthermore, the frequency of the current generated by each generator is locked in frequency to the frequency of the alternating current generated external to the generating system. The synchronization count is transmitted asynchronously with respect to the frequency of electrical current generated external to the system.

BRIEF DESCRIPTION OF THE DRAWINGS

FIG. 4 illustrates a partial block diagram of a master generator control unit.

FIG. 7 illustrates a block diagram of a second embodiment of the invention in which a pair of generators are phase locked to an external power source.

FIG. 8 illustrates a partial block diagram of the master control unit of FIG. 7.

BEST MODE FOR CARRYING OUT THE INVENTION

Figure 1:
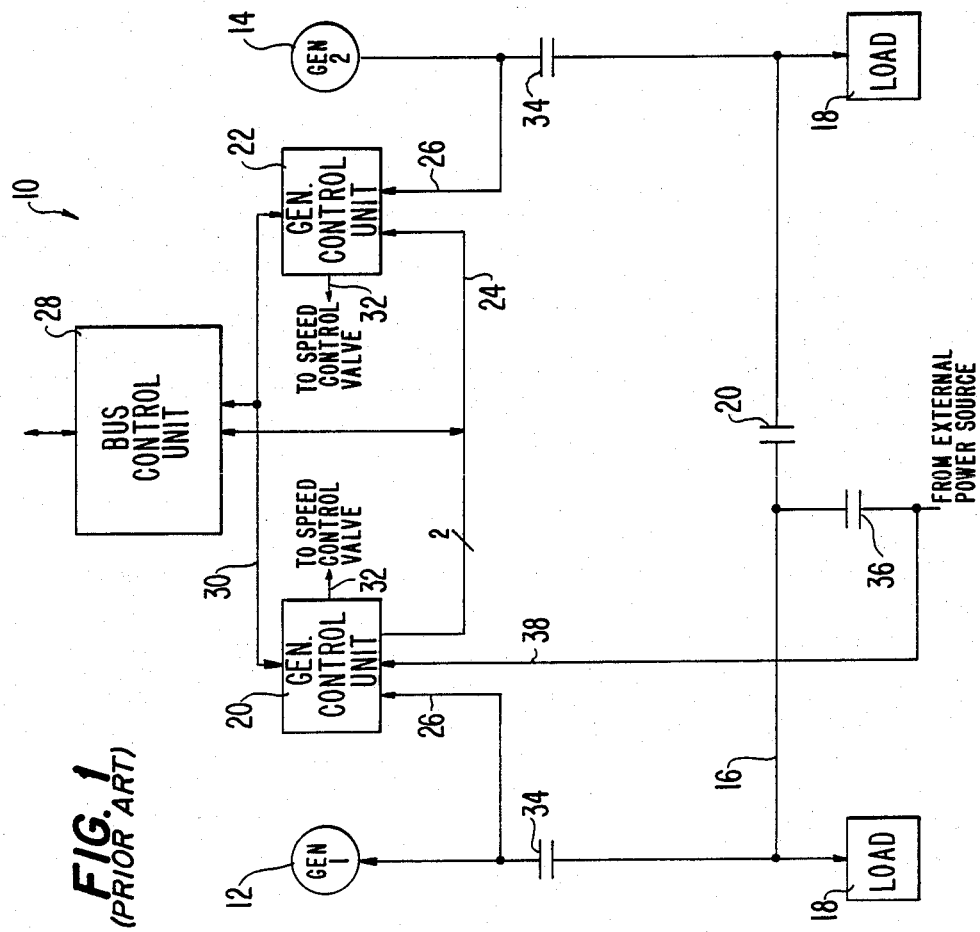
FIG. 1 illustrates a prior art system of the assignee.
Figure 2:
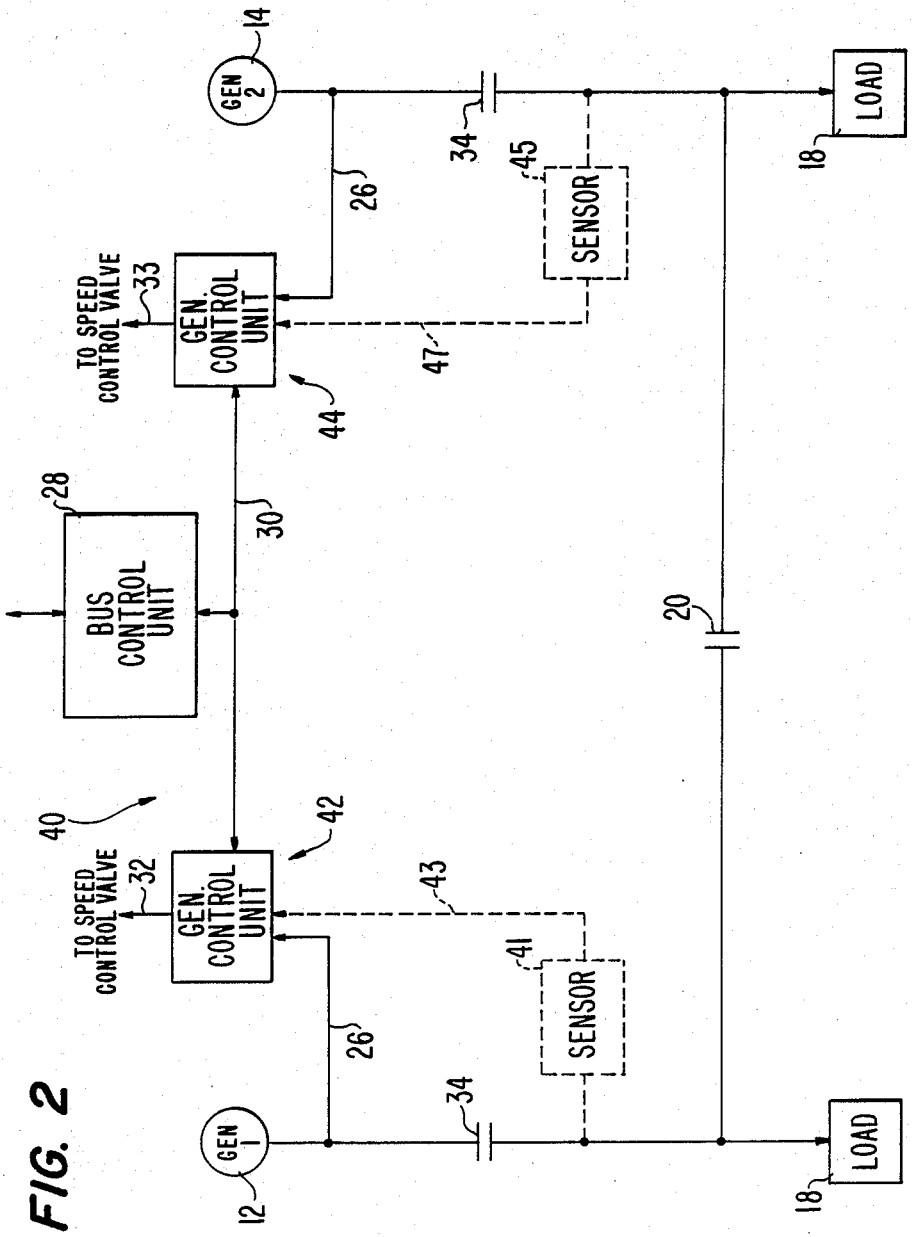
FIG. 2 illustrates a block diagram of a first embodiment of the present invention.
Figure 5:
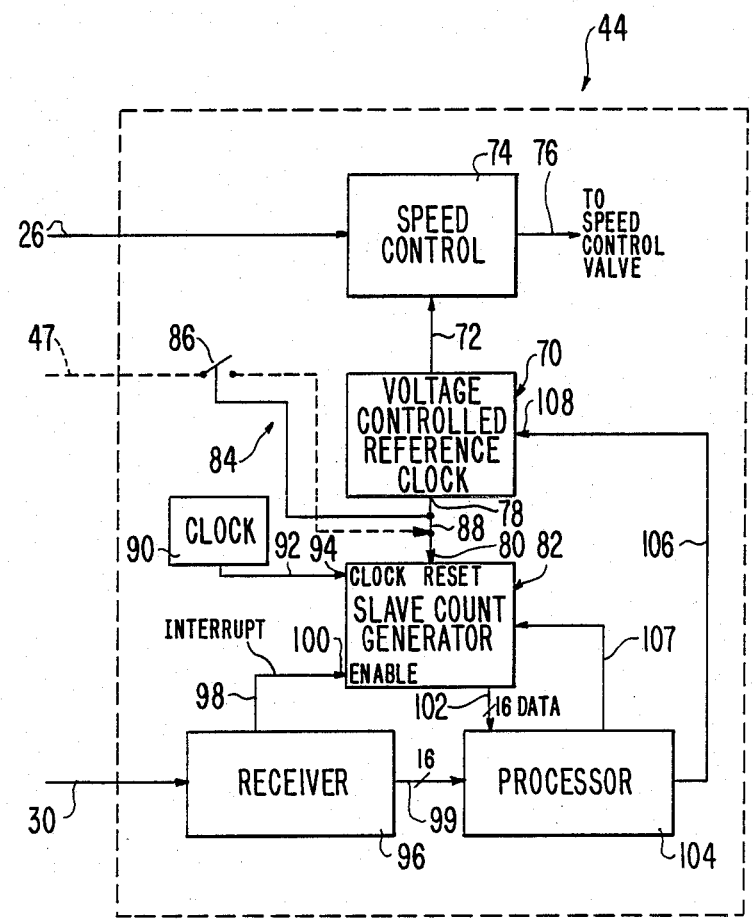
FIG. 5 illustrates a partial block diagram of a slave generator control unit.

FIG. 2 illustrates a block diagram of a first embodiment 40 of the present invention. Like reference numerals identify like parts in the FIGS. of the drawings. It should be understood that the invention is applicable to either single or multiphase power generation systems with the drawings not illustrating multiple phases to simplify the illustration. The first embodiment 40 of the present invention differs from the prior art of FIG. 1 functionally with respect to the master generator control unit 42 and the slave generator control unit 44. FIGS. 4 and 5 respectively illustrate preferred embodiments of the master generator control unit 42 and the slave generator control unit 44. Like FIG. 1, the CSD or IDG for respectively controlling the rotational velocity applied to generators 12 and 14 has been omitted. The phase and frequency of the alternating current generated by the slave generator 14 is locked to the phase and frequency of the alternating current generated by master generator 12. While the invention is not limited to asynchronous transmission thereto, a synchronization count is transmitted asynchronously with respect to the frequency of alternating current generated by the master generator 12 over the serial communication bus 30 between the master generator control unit 42 to the slave generator control unit 44. It should be understood that the master generator control unit 42 may be used to generate and transmit the synchronization count to a plurality of slave generator control units 44 for controlling a plurality of slave generators 14 with only a single slave generator 14 being illustrated for purposes of simplifying the illustration. The synchronization word described below is transmitted in digital format asynchronously with respect to the frequency of the alternating current generated by the master generator 12 over the serial communication bus 3 from the master generator control unit 42 to each slave generator control unit 44 under the control of bus control unit 28. The bus control unit 28 issues interrupts for transmitting the synchronization count asynchronously with respect to the frequency of the alternating current generated by the generating system of the present invention with acceptable operation being obtained by sending of the synchronization word once every four to six cycles of the 400 Hz alternating current generated by the generating system of the present invention. Timing information for controlling the phase and frequency of electrical current generated by the generators 12 and 14, respectively, may be generated within the generator control units 42 and 44 as described below with reference to FIGS. 4 and 5. Alternatively, the timing information for controlling the phase and frequency of electrical current generated by the generators 12 and 14, respectively, may be generated by the sensors 41 and 45, respectively. The sensor 41 would be connected to master generator control unit 42 by line 43 and the sensor 45 would be connected to slave generator by line 47. In a preferred form of the invention, as described below with reference to FIG. 4, the time reference of the master generator control unit 42 is generated by a highly stable reference clock which is utilized to precisely control the rotational velocity of the input shaft to the master generator by modulation of the speed control valve of the CSD or IDG in a conventional fashion. In a preferred form of the invention, as described below with reference to FIG. 5, the time reference of the slave generator control unit 44 may be generated by a voltage controlled clock which is used to precisely control the rotation of the input shaft to the slave generator by modulation of the speed control valve of the CSD or IDG in a conventional fashion.

The phase and frequency locking of the alternating current generated by the at least one slave generating unit 14 to the phase and frequency of electrical current generated by the master generator 12 is accomplished by the transmission of the aforementioned digitally encoded synchronization count asynchronously with respect to the frequency of the alternating current being generated by the master generator over the serial communication bus 30 under the control of the bus control unit 28 to the at least one generator control unit 44. Each of the master generator control unit 42 and the at least one slave generator control unit 44 contains a highly stable count generator which produces a predetermined count over each cycle of the alternating current produced respectively by the master generator and the at least one slave generator. A stable count generator is described with reference to FIG. 9 below. In a preferred embodiment of the invention, each of the aforementioned count generators in the master generator control unit 42 and the at least one slave generator control units 44 counts cyclically from zero up to 65,536 over each cycle of the 400 Hz power being generated by the generators 12 and 14. As a consequence of each of the count generators counting to the same predetermined count over each cycle of the 400 Hz current produced by the master generator 12 and the at least one slave generator 14, a phase control signal for each of the slave generators may be generated as a function of the difference between the synchronization counts of the master generator control unit and slave generator control unit. As a consequence of delays in signal processing, a compensation count, which is a function of at least the delay of the master generator control unit 42 in providing the synchronization count of the master count generator to the transmission system comprised of the bus control unit 28 and serial bus 30 for transmission to the slave generator control unit 44, delay of the transmission system in transmitting the synchronization count of the master count generator to the slave generator control unit and delay of the slave generator control unit in receiving the synchronization count of the master count generator and generating a correction count, described below, is added to the synchronization count generated by the slave count generator which combined sum is subtracted from the received synchronization count produced by the count generator of the master generator control unit.

Figure 3:
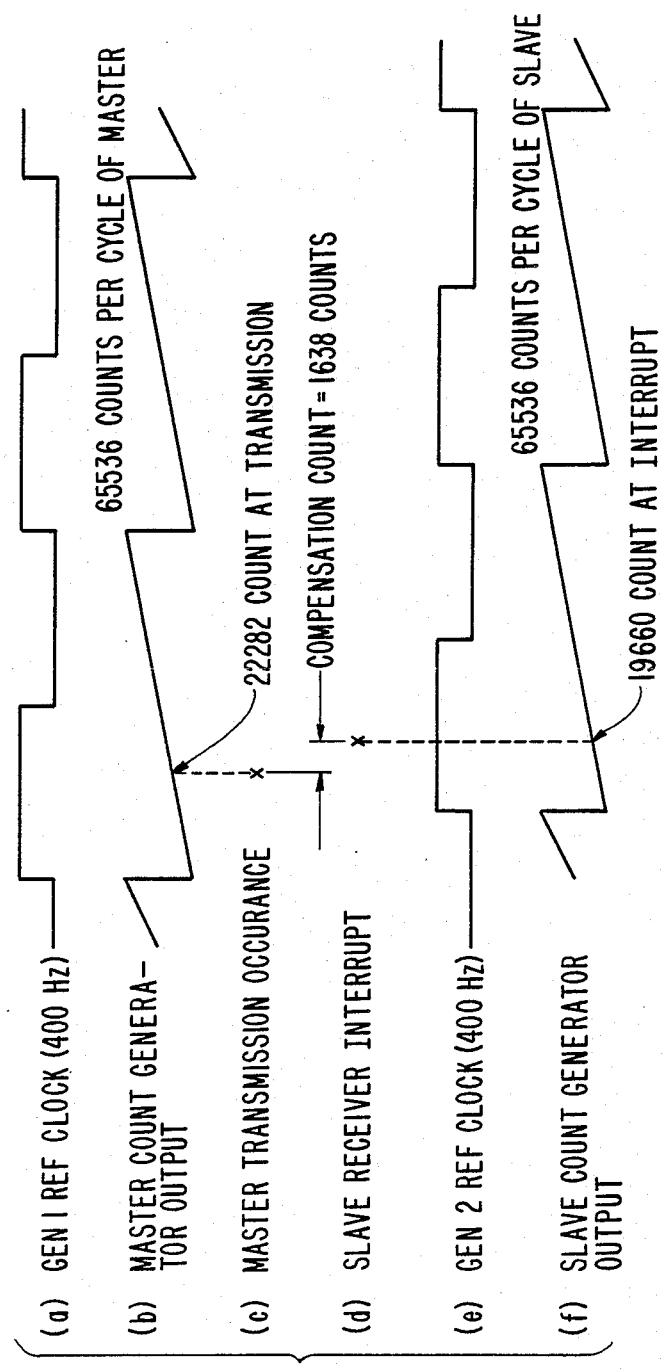
FIG. 3 illustrates various waveforms of the embodiment of FIG. 2 for phase locking one slave generator with a master generator.

FIG. 3 is described as follows with reference to the system of FIG. 2 with it being understood that the description is also generally applicable to FIG. 7. FIG. 3A illustrates a 400 Hz reference clock frequency which is generated by the reference clock 46 described below with reference to FIG. 4 which is used to control the output velocity from the IDG or CSD drive which drives the master generator 12. FIG. 3B illustrates a sawtooth waveform having a constant slope which slope represents the cyclical counting of the master count generator 52 described below with reference to FIG. 4 of the master generator control unit 42 between 0 and the maximum count of 65,536. As illustrated, the count of 22,282 occurs 34% of the way through a single cycle of the 400 Hz reference clock frequency of the master generator control unit 42. FIG. 3C illustrates the time of transmission of the 22,282 synchronization count produced by the count generator of the master generator control unit 42 by the transmission system as described below. FIG. 3D illustrates the time at which the individual slave generator control units 44 receive the aforementioned transmitted synchronization count of 22,282. The difference between the time of transmission as marked by FIG. 3C and the time of reception is marked by FIG. 3D is approximately 1638 counts long. The aforementioned compensation count of 1638 plus any additional delay compensation factors must be added to the count generated by the slave generator control unit 44 at the time of taking the difference between the transmitted synchronization count produced by the master count generator and the synchronization count produced by the slave count generator. It should be noted that the compensation count is a system parameter which is a function of several variables such as architecture of the system and components which will vary from system to system. FIG. 3E illustrates the reference clock frequency generated by the voltage controlled reference clock of the slave generator control unit 44 which is described below with reference to FIG. 5. It should be noted that as illustrated there is a phase displacement between the current being generated by the master generator 12 and the slave generator 14 which requires phase correction and furthermore that the basic frequency of the two clocks is identical. In actual practice there may be a difference in frequency between the clocks indicative of a frequency deviation between the master 12 and slave 14 generator(s) which necessitates a frequency correction by the system described below in conjunction with FIG. 6. FIG. 3F illustrates a sawtooth wave having a constant slope representing the cyclical counting of the count generator of the slave unit from 0 to the maximum of 65,536 counts over each cycle of alternating current generated by the slave generator 14. The correction count is computed by subtracting the sum of the compensation count of 1,638 and the 19,660 synchronization count of the slave generator control unit 44 from the 22,282 synchronization count of the master generator control unit 42. The resultant correction count is utilized as the control signal for varying the phase of the alternating current generated by the slave generator 14 to at least phase lock the slave generator to the master generator 12.

FIG. 4 illustrates a block diagram of the master generator control unit 42 illustrated in FIG. 2. A reference clock 46 provides the time base for regulating the frequency of alternating current produced by the master generator 12. The output frequency of the reference clock 46 for applications involving airframes is 400 Hz as illustrated above in FIG. 3A. The 400 Hz pulse train is outputted on output 48 which is applied to speed control 50 which regulates the rotational velocity applied to the three phase alternator of the generator 12 by modulating the speed control valve of the IDG or CSD associated with the generator 12 in a conventional fashion. A feedback signal proportional to the rotational velocity of the shaft driving the generator 12 is applied to the speed control 50 on line 26. Master count generator 52 functions to produce the time varying synchronization count which varies from a minimum to a maximum during each cycle of the alternating current generated by the master generator 12 as described above with reference to FIG. 3B. The counting interval is defined by pulses applied on reset 54. As illustrated, the reset pulses are the positive going interval of the reference clock 46 when the ganged switch 56 is closed. Preferably, the reset pulses are produced by the reference clock 46 which is connected to reset 54 through closed contact 57 of switch 56 but, as illustrated in FIG. 2, the reset pulses may alternatively be applied on line 43 through closed contact 58 from sensor 41 which may be a zero crossing point detector that derives the reset pulses directly from one of the phases of the generator 12. High frequency clock 60 applies pulses to be counted on output 62 to the clock input 64 of the master count generator 52. In the preferred form of the present invention, the output frequency of the clock 60 is substantially higher than the frequency of the alternating current produced by the generator 12. As illustrated in FIGS. 3A and 3B, the output frequency from the clock 60 is 65,536 times higher than the frequency of the alternating current produced by the master generator 12. However, it should be understood that the invention is not limited to the aforementioned frequency relationship between the output frequency produced by the reference clock 46 and the output frequency produced by the clock 60. The output from the master count generator is applied on a parallel output bus 66 to communication control 68. The communication control 68 interfaces with the serial communication bus 30 to asynchronously, with respect to the frequency of alternating current produced by the master generator, output the instantaneous synchronization count of the master count generator 52 at the time the bus control unit 28 provides the communication control 68 control of the serial bus 30 for transmitting the synchronization count to each of the slave generator control units 44. As described above with reference to the prior art, the serial bus is utilized to transmit a whole range of communications other than the aforementioned asynchronous transmission of the synchronization count. Furthermore, it should be understood that the synchronization count could alternatively be transmitted synchronously with the frequency of the generated alternating current such as once per an integer number of cycles of alternating current. The communication control 68 functions as a gate with respect to providing the synchronization count to the transmission system. As described above, the synchronization count does not have to be transmitted from the master generator control unit 42 to the at least one slave generator control units 44 during each cycle of alternating current produced by the master generator 12. Depending upon the stability of the voltage controlled reference clock 70, as described below with reference to FIG. 5, transmission of the synchronization count every four to six cycles of the alternating current produced by the master generator 12 should be sufficient to maintain stable phase and frequency locking of the alternating current produced by each slave generator 14 to the alternating current produced by the master generator. The utilization of asynchronous transmission of the synchronization count between the master generator control unit 42 and each slave generator control unit 44 over the serial communication bus 30 has the advantage of eliminating the redundant synchronization lines 24 described above with regard to the prior art in FIG. 1.

FIG. 5 illustrates a block diagram of the slave generator control unit 44 of FIG. 2. A voltage controlled reference clock 70 produces the 400 Hz waveform of FIG. 3E. The output clock signal from the voltage controlled reference clock 70 on output line 72 is applied to speed control 74. The speed control 74 has an input on line 26 which is proportional to the input shaft speed on the slave generator 14. The speed control 74 is conventional and produces an output 76 which is applied to a speed control valve of the IDG or CSD of the slave generator 14. The voltage controlled reference clock 70 also has an output 78 which may be selectively applied to reset input 80 of slave count generator 82. Ganged switch 84 has contacts 86 and 88 which are respectively open and closed or closed and open depending upon the position of the ganged switch. When, as illustrated, the output 78 of the voltage controlled reference clock 70 is applied to the reset input 80 to provide the signal of FIG. 3E described above, the contact 88 is closed and the contact 86 is open. Alternatively, when the contacts 86 and 88 of the switch 84 are positioned in the opposite position, as illustrated in FIG. 5, the sensor 45, which may be a zero crossing point detector, applies the reference clock to the reset input 80 of the slave count generator 82. The slave count generator 82 functions to count the synchronization count as described above with reference to FIG. 3F. A clock 90 produces on an output 92 a clock signal which is applied to the clock input 94 of the slave count generator 82 which is counted as described above with reference to FIG. 3F. Preferably, the output frequency of the clock 90 is substantially higher than the frequency of the alternating current generated by the slave generator 14 and, as illustrated in FIG. 3F, is 65,536 times higher. However, it should be understood that the invention is not limited to this frequency relationship. Receiver 96 receives the synchronization count transmitted by the master generator control unit 42 over the serial communication bus 30. Upon receipt of the synchronization count, an interrupt is generated on output 98 which is applied to the enable input 100 of the slave count generator 82 to cause the instantaneous count of the slave count generator to be latched and outputted on parallel data bus 102. Parallel bus 99 applies the received synchronization count to the processor 104, which may be any processor such as, but not limited to, a microprocessor, where the received synchronization count is buffered until the correction count is computed as described below with reference to FIG. 6 below. Processor 104 computes the difference between the synchronization count outputted by the slave count generator 82 and the received synchronization count for generating the correction count which is applied on output 106 to the control input 108 of the voltage controlled reference clock 70 to vary the clock frequency in a manner to drive the phase and frequency of the alternating current produced by the slave generator 14 back into phase and frequency with the phase and frequency of the alternating current produced by the master generator 12. Line 107 feeds back a signal to the slave count generator 82. The processing operation performed by processor 104 is described below with reference to FIG. 6. It should be further understood that the present invention is not limited to the arithmetic computation of the compensation by a processor with the invention being alternatively implemented in other types of computation circuits including hardware with the terminology "processor" describing all possible implementations for making calculations involving counts as described herein.

Figure 6:
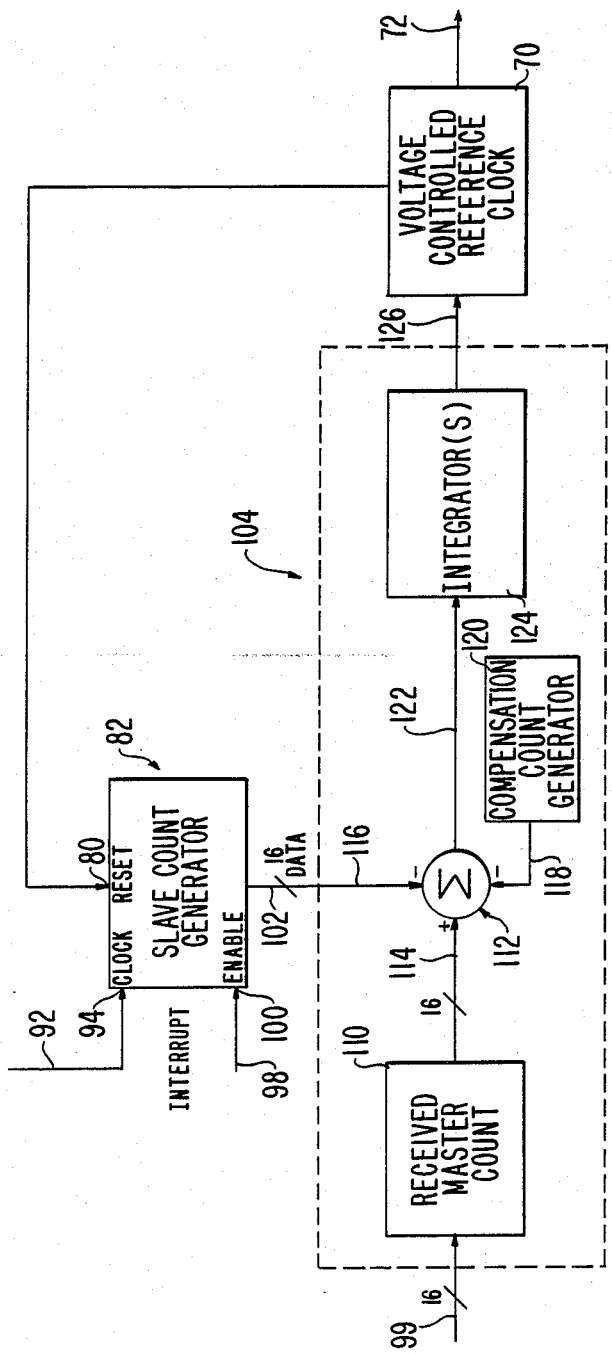
FIG. 6 illustrates a block diagram illustrating the operation of the processor of FIG. 5.

FIG. 6 illustrates functionally the arithmetic computations performed by the processor 104 of FIG. 5. Buffer 110 stores the received synchronization count of FIG. 3B described above. Summer 112 computes the arithmetic difference between the buffered synchronization count inputted on line 114 and the sum of the synchronization count outputted by the slave count generator 82 on line 116 upon the occurrence of an interrupt signal on line 98 and a compensation count on line 118 which is generated by compensate count generator 120. The compensation count is at least a function of delay of the master generator control unit in providing the synchronization count of the master count generator 52 to the serial communication bus 30 which is controlled by bus control unit 28, delay of the bus control unit 28 and the serial communication bus 30 in transmitting the synchronization count of the master count generator to the slave generator control unit 44 and delay of the slave generator control unit in receiving the master count and generating the compensation count. It should be understood that other delays may also be compensated for by the compensation count generator 120 which are a function of electronic circuits located in both the master generator control unit 42 and in the slave generator control unit 44 and the communication system utilized for transmitting the synchronization count from the master generator control unit 42 to each slave generator control unit 44. The output 122 from the summer 112 is applied to integrators 124 which produce an output 126 which controls the oscillation frequency of the voltage controlled reference clock 70 to change the frequency thereof to lock the phase and frequency of the alternating current generated by the associated slave generator 14 to the phase and frequency of the alternating current generated by the master generator 12. When a pair of integrators 124 are coupled in series between the summer 112 and the voltage controlled reference clock 70, the slave or controlled generator is locked in frequency and phase to the master generator or external source of alternating current. If there is not an appreciable frequency difference between the master or external alternating current source and the slave or controlled generator, only a single integrator 124 is required to phase lock the slave or controlled generator to the master or external source.

FIG. 7 illustrates a second embodiment 120 of the present invention. The second embodiment differs from the first embodiment described above in that the phase and frequency of electrical current generated by a pair of slave generators 14 is locked to the frequency and phase of an external power source such as a power bus. Master control 123 performs the same function in generating the synchronization count as the master control unit 42 described above with respect to FIGS. 2-4. It should be understood that this embodiment is not limited to any particular number of slave generators 14 which are controlled from an external power source with two being illustrated just for purposes of illustration.

An embodiment of the master control unit 123 is illustrated in detail in FIG. 8. Identical parts in this embodiment which have been described above with reference to FIG. 2 will not be further described. As illustrated, the external source of alternating current to which the slave generators 14 are phase and frequency locked is a power line 124. However, it should be understood that other external sources may be utilized as the phase and frequency reference for locking the phase and frequency of alternating current generated by the slave generators 14. Zero crossing detector 126, which receives the power from power line 124 on input 128, produces on output 130 a waveform synchronized with the zero crossing points of the alternating current from power line 124. The function performed by the zero crossing points on output 130 is analogous to the function performed by the reference clock of FIG. 3A described above. The master count generator 52 performs the same function as described above with reference to FIG. 3B. The difference between the embodiments of FIGS. 2 and 7 is that the master control unit 122 of FIG. 7 does not control the phase and frequency of alternating current produced by a master generator. The remainder of the functions are identical.

Figure 9:
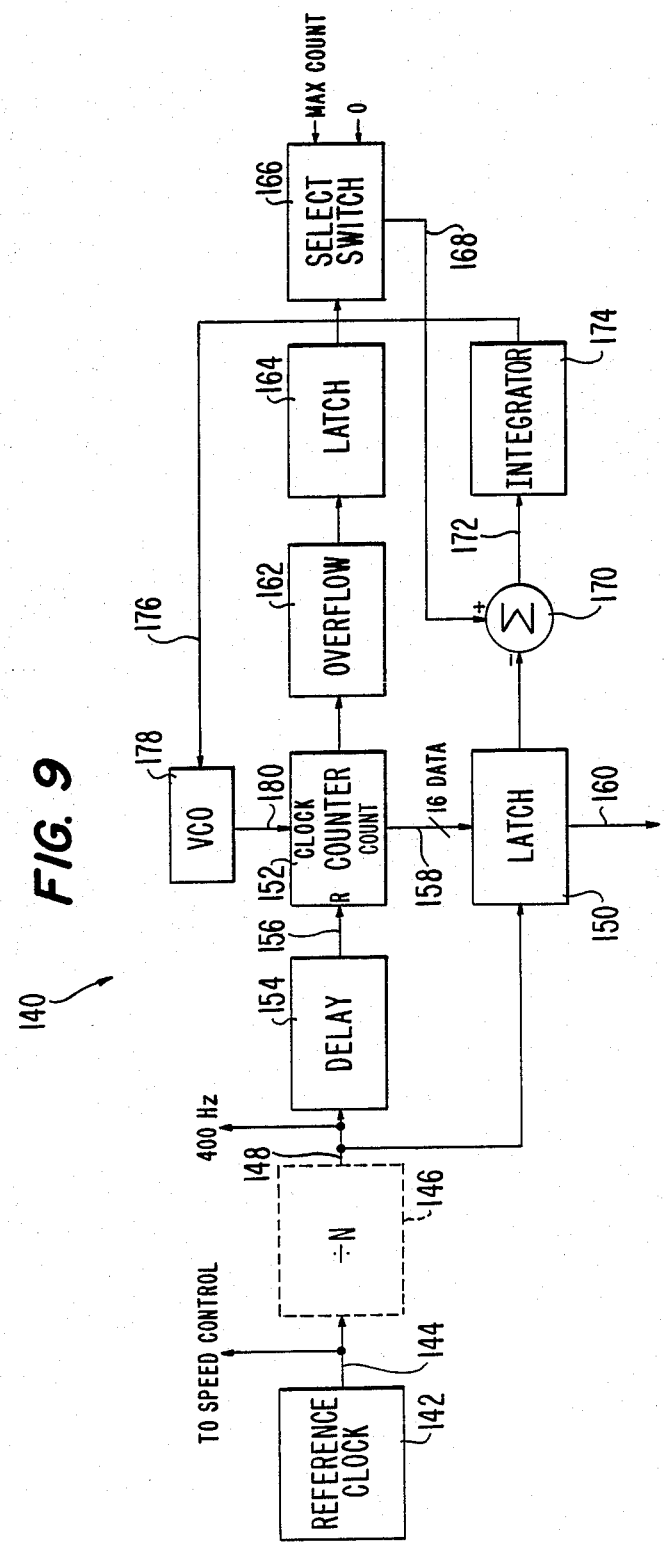
FIG. 9 illustrates a block diagram of a system for maintaining counting of the counter of either the master control unit or the at least one slave control unit to a predetermined value for a complete cycle of alternating current.

FIG. 9 illustrates a preferred embodiment of controlled counter 140 which may be utilized in both the master control unit 42 and each slave control unit 44 to control the master count generator 52 and the slave count generators 82 to count to the same predetermined number of counts during each cycle of alternating current respectively generated by the master generator 12 and each slave generator 14 such as 65,536 described above with reference to FIG. 3. The controlled counter 140 utilizes a reference clock 142 which produces an output series of pulses having a frequency which is an integer multiple of the frequency of the alternating current to be generated such as that illustrated in FIGS. 3A and 3E described above. Output 144 is applied to the speed control which may be either the speed control 50 or 74 of FIGS. 4 and 5 respectively. An optional divider 146 divides the output 144 by an integer n if the reference clock frequency 142 differs from the reference frequencies illustrated in FIGS. 3A or 3E by an integer n other than 1. The output 148 of the divider 146 provides a 400 Hz output signal having a frequency identical to that illustrated in FIGS. 3A and 3E described above. Latch 150 stores the output of counter 152 which performs the function of the master count generator 52 or the slave count generator 82 as described above with reference to FIGS. 3-5. Delay 154 is provided to permit the latch 150 to latch up the count of the counter 152 prior to resetting of the counter in response to output 156. The count of counter 152 is applied on data bus 158 to the latch 150 as described above. The output 160 of latch 150 is applied either to the communication control 68 of FIG. 4 or to the processor 104 of FIG. 5 depending on whether the stabilized clock is implemented in either the master control unit 42 or the at least one slave control units 44. The latch 150 latches the data outputted from the counter 152 on the positive going edge of the output from divider 146. Overflow detector 162 detects when a predetermined overflow is reached which typically is the maximum counting capability of the counter such as 65,536 described above with reference to FIGS. 3B and 3F. The output 163 of the overflow detector is applied to an overflow latch 164 which produces a high output on output 165 when the overflow detector 162 detects an overflow. The output 165 of the latch 164 is supplied to a select switch 166 which in the absence of an overflow outputs the maximum count of the counter which, as described above, is 65,536. When the output 165 goes high indicating that an overflow has been detected by overflow detector 162, the output 168 from the select switch 166 is changed to zero. The output 168 is applied to a summer 170 which computes the difference between the output from latch 150 and the output from the select switch 166. When an overflow is indicated, a zero count is outputted on line 168 and when no overflow is indicated, the maximum count of the counter 152 is outputted on line 168. The difference 172 is integrated by integrator 174. The output 176 from the integrator 174 is applied to a voltage controlled oscillator which outputs a clock signal on output 180 which is applied to the clock input of counter 152. The voltage controlled oscillator 178 varies in frequency in direct proportion to the output 176 from the integrator 174 to insure that the count of the counter is precisely locked to the predetermined count such as 65,536 as described above with reference to FIG. 3 over the time interval of a single cycle of alternating current generated by either the master generator 12 or slave generator 14 which may be of varying frequency.

While the invention has been described in terms of its preferred embodiments, it should be understood that numerous modifications may be made thereto without departing from the spirit and scope of the present invention. The block diagrams of FIGS. 2 and 7 may be modified to incorporate different functions within different blocks. The function performed by the master control unit 123 as discussed above with respect to FIG. 8 may be implemented in one of the generator control units 44. Different configurations of loads 18 may be utilized and different configurations of contactors 20, 34 and 36 may also be utilized. It is intended that all such modifications fall and other modifications within the scope of the appended claims.

I claim:

1. An alternating current generating system having at least one slave generator with each slave generator being controlled by an associated slave generator control unit with alternating current generated by each slave generator being at least locked in phase to alternating current generated by a master generator controlled by a master generator control unit wherein:
   the master generator control unit includes a master count generator for generating a synchronization count varying from a minimum to a maximum during each cycle of the alternating current generated by the master generator with the synchronization count being proportional at any time during a cycle of the alternating current to a phase of electrical current being generated by the master generator with respect to a time reference;
   each of the slave generator control units includes a slave count generator, each slave count generator generating a synchronization count varying from the minimum to the maximum during each cycle of the alternating current generated by the slave generator controlled by the slave generator control unit with the synchronization count of each slave count generator at any time during a cycle of alternating current generated by the slave generator controlled by the slave generator control unit being proportional to a phase of the generated alternating current measured with respect to a time reference;
   a transmission system is coupled to the master generator control unit and each of the slave generator control units for periodically transmitting the synchronization count from the master count generator to each slave generator control unit;
   each slave generator control unit has a processor for generating a correction count which is a function of a difference between the synchronization count received from the master control unit and the synchronization count of the slave count generator; and
   each slave generator control unit has a controller for adjusting at least the phase of the alternating current generated by the slave generator controlled by the slave generator control unit as a function of the correction count.

2. A system in accordance with claim 1 wherein:
   each slave generator control unit controller also locks a frequency of alternating current generated by each slave generator to a frequency of the alternating current generated by the master generator.

3. A system in accordance with claim 2 wherein the correction count comprises:
   the synchronization count received from the master control unit less the sum of the synchronization count of the slave count generator and a compensation count.

4. A system in accordance with claim 3 wherein:
   the compensation count is a function of delay of the master generator control unit in providing the synchronization count of the master count generator to the transmission system for transmission to the generator control unit.

5. A system in accordance with claim 3 wherein:
   the compensation count is a function of delay of the transmission system in transmitting the synchronization count of the master count generator to the slave generator control unit.

6. A system in accordance with claim 3 wherein:
   the compensation count is a function of delay of the slave generator control unit in receiving the synchronization count of the master count generator and generating the correction count.

7. A system in accordance with claim 3 wherein:
   the compensation count is a function of delay of the master generator control unit in providing the synchronization count of the master count generator to the transmission system for transmission to the slave generator control unit, delay of the transmission system in transmitting the synchronization count of the master count generator to the slave generator control unit and delay of the slave generator control unit in receiving the synchronization count of the master count generator and generating the compensation count.

8. A system in accordance with claim 2 wherein:
   the transmission system transmits the synchronization count of the master count generator asynchronously, with respect to a frequency of the current generated by the master generator, to each slave generator control unit 9. A system in accordance with claim 8 wherein the transmission system comprises:
   a serial communication bus coupling the master generator control unit to each slave generator control unit; and
   a bus control unit controlling transmission of communications between the master generator control unit and each slave generator control unit, the bus control unit asynchronously with respect to the frequency of current generated by the master generator sampling the synchronization count of the master count generator and causing transmission of the sampled synchronization count to each slave generator control unit on the serial communication bus.

10. A system in accordance with claim 9 wherein:
    the bus control unit time multiplexes the transmission of the sampled synchronization count from the master generator control unit to each of the slave generator control units over the serial communication bus with transmission of other communications between the master generator control unit and the each slave generator control unit over the serial communication bus.

11. A system in accordance with claim 3 wherein:
the transmission system periodically transmits the synchronization count of the master count generator, asynchronously with respect to a frequency of current generated by the master generator, to each slave generator control unit.

12. A system in accordance with claim 11 wherein the transmission system comprises:
 a serial communication bus coupling the master generator control unit to each slave generator control unit; and
 a bus control unit controlling transmission of communications between the master generator control unit and each slave generator control unit, the bus control unit asynchronously with respect to the frequency of current generated by the master generator sampling the synchronization count of the master count generator and causing transmission of the sampled synchronization count to each slave generator control unit on the serial communication bus.

13. A system in accordance with claim 12 wherein:
the bus control unit time multiplexes the transmission of the sampled synchronization count from the master generator control unit to each slave generator control unit over the serial communication bus with transmission of other communications between the master generator control unit and the each slave generator control unit over the serial communication bus.

14. A system in accordance with claim 2 wherein the master generator control unit comprises:
 a reference clock for producing on an output pulses defining each cycle of the alternating current produced by the master generator;
 a counter having a reset input and a clock input which counts a predetermined count of pulses received on the clock input and an output which outputs the count of the counter as the synchronization count;
 a clock having an output coupled to the clock input of the counter for producing pulses on the output which are counted by the counter, the pulses on the output having a frequency higher than a frequency of the alternating current generated by the master generator;
 the output of the reference clock being connected to the reset input of the counter; and
 means, coupled to the output of the counter, for applying the count of the counter to the transmission system in response to a bus control signal.

15. A system in accordance with claim 14 wherein:
the output pulses from the reference clock are applied to a frequency control which controls the frequency of the alternating current produced by the master generator.

16. A system in accordance with claim 2 wherein each slave generator control unit comprises:
 means for receiving the synchronization count transmitted from the master generator control unit and for generating an interrupt pulse in response to receipt of the synchronization count;
 the slave count generator having an enable input to which is applied the interrupt pulse to sample the synchronization count of the slave count generator, a clock input to which is applied clock pulses which are counted by the slave count generator, the pulses having a frequency higher than a frequency of the alternating current generated by the slave generator, and a reset input which is the time reference and an output which is the synchronization count of the slave generator control unit.

17. A system in accordance with claim 16 wherein:
the controller includes a variable frequency clock to which is applied the correction count which has been integrated by a pair of integrators coupled in series to the correction count for controlling the frequency of pulses produced by the variable frequency clock, the variable frequency clock producing clock pulses having a frequency locked to the frequency of the alternating frequency current produced by the slave generator.

18. A system in accordance with claim 17 wherein:
the clock pulses are applied to a frequency control which controls the frequency of the alternating current produced by the slave generator.

19. A system in accordance with claim 14 wherein each slave generator control unit comprises:
 means for receiving the synchronization count transmitted from the master generator control unit and for generating an interrupt pulse in response to receipt of the synchronization count;
 the slave count generator having an enable input to which is applied the interrupt pulse to sample the synchronization count of the slave count generator, a clock input to which is applied clock pulses which are counted by the slave count generator, the pulse having a frequency higher than a frequency of the alternating current generated by the slave generator, and a reset input which is the time reference and an output which is the synchronization count of the slave generator control unit.

20. A system in accordance with claim 2 wherein:
the time reference of the master count generator is produced by a reference clock which controls the frequency of alternating current generated by the master generator and resetting of the master count generator.

21. A system in accordance with claim 2 wherein:
the time reference of the master count generator is derived from the alternating current generated by the master generator.

22. A system in accordance with claim 2 wherein:
the time reference of each slave count generator is produced by a reference clock which controls the frequency of alternating current generated by the slave generator and resetting of the slave count generator.

23. A system in accordance with claim 2 wherein:
the time reference of each slave count generator is derived from the alternating current generated by the master generator.

24. A method of at least phase locking alternating current generated by at least one slave generator to alternating current generated by a master generator comprising:
 periodically transmitting a synchronization count from a master generator control unit controlling the master generator to at least one slave generator control unit with each slave generator being controlled by a slave generator control unit, the synchronization count being proportional to a phase with respect to a time reference and, cyclically varying between a minimum and a maximum over each period of alternating current generated by the master generator;

each slave generator control unit generating a synchronization count which varies between the minimum and the maximum over each period of alternating current generated by the slave generator controlled by the slave generator control unit; and each slave generator control unit generating a correction count which is a function of a difference between the received synchronization count and the synchronization count generated by the slave generator control unit and adjusting at least the phase of alternating current generated by the slave generator controlled by the slave generator control unit as a function of the correction count to cause the alternating current generated by the master and the at least one slave generator units to be locked in phase.

25. A method in accordance with claim 24 further comprising:

adjusting a frequency of alternating current generated by each slave generator as a function of the correction count to cause the alternating current generated by the master and at least one slave generator unit to be locked in frequency.

26. A method in accordance with claim 25 wherein: the periodic transmission of the synchronization count from the master generator control unit to each slave generator control unit is asynchronous with respect to a frequency of current generated by the master generator.

27. A method in accordance with claim 27 wherein: the correction count comprises the synchronization count received from the master control unit less the sum of the synchronization count of the slave count generator and a compensation count.

28. A method in accordance with claim 27 wherein: the compensation count is a function of delay of the master generator control unit in providing the synchronization count of the master count generator to the transmission system for transmission to the at least one slave generator control unit.

29. A method in accordance with claim 27 wherein: the compensation count is a function of delay of the transmission system in transmitting the synchronization count of the master generator control unit to the slave generator control unit.

30. A method in accordance with claim 27 wherein: the compensation count is a function of delay of the slave generator control unit in receiving the synchronization count of the master count generator and generating the correction count.

31. A method in accordance with claim 27 wherein: the compensation count is a function of delay of the master generator control unit in providing the synchronization count of the master count generator to the transmission system for transmission to the slave generator control unit, delay of the transmission system in transmitting the synchronization count of the master count generator to the slave generator control unit, and delay of the slave generator control unit in receiving the synchronization count of the master count generator and generating the correction count.

32. An alternating current generating system having at least one alternating current generator with each alternating current generator generating alternating current locked at least in phase to alternating current generated external to the system comprising:

an input for receiving the alternating current external to the system;

a master control unit, responsive to the alternating current external to the system, having a master count generator for generating a synchronization count varying from a minimum to a maximum during each cycle of the alternating current external to the system with the synchronization count being proportional at any time during the cycle of the alternating current external to the system to a phase of the alternating current external to the system with respect to a time reference;

a generator control unit associated with each alternating current generator, each generator control unit having a count generator, each count generator of each generator control unit generating a synchronization count varying from the minimum to the maximum during each cycle of alternating current generated by the generator controlled by the associated generator control unit with the synchronization count of each count generator of a generator control unit at any time during a cycle of alternating current generated by the generator being proportional to a phase of the generated alternating current with respect to a time reference;

a transmission system coupled to the master generator control unit and each generator control unit for periodically sending the synchronization count from the master count generator to each generator control unit; and wherein each generator control unit has a processor for generating a correction count which is a function of a difference between the received synchronization count and the synchronization count generated by the generator control unit; and each generator control unit has a controller for adjusting at least the phase of the electrical current generated by the generator controlled by the generator control unit as a function of the correction count.

33. An alternating current generating system in accordance with claim 32 wherein:

each generator control unit controller also locks a frequency of alternating current generated by the associated generator to a frequency of the alternating current external to the system.

34. A system in accordance with claim 33 wherein: the compensation count is a function of delay of the master generator control unit in providing the synchronization count of the master count generator to the transmission system for transmission to the generator control unit.

35. A system in accordance with claim 33 wherein: the compensation count is a function of delay of the transmission system in transmitting the synchronization count of the master count generator to the slave generator control unit.

36. A system in accordance with claim 33 wherein: the compensation count is a function of delay of the slave generator control unit in receiving the synchronization count of the master count generator and generating the correction count.

37. A system in accordance with claim 33 wherein:
the compensation count is a function of delay of the master generator control unit in providing the synchronization count of the master count generator to the transmission system for transmission to the slave generator control unit, delay of the transmission system in transmitting the synchronization count of the master count generator to the slave generator control unit, and delay of the slave generator control unit in receiving the synchronization count of the master count generator and generating the correction count.

38. A system in accordance with claim 33 wherein:
the transmission system periodically transmits the synchronization count of the master count generator asynchronously with respect to a frequency of the alternating current generated exterior to the system to each generator control unit.

39. A system in accordance with claim 38 wherein the transmission system comprises:
a serial communication bus coupling the master generator control unit to each generator control unit; and
a bus control unit controlling transmission of communications between the master generator control unit and each generator control unit, the bus control unit asynchronously with respect to the cycle of alternating current generated exterior to the system sampling the synchronization count of the master count generator and causing transmission of the sampled synchronization count to each generator control unit on the serial communication bus.

40. A system in accordance with claim 39 wherein:
the bus control unit time multiplexes the transmission of the sampled synchronization count from the master generator control unit to each generator control unit over the serial communication bus with transmission of other communications between the master generator control unit and each generator control unit over the serial communication bus.

41. A system in accordance with claim 33 wherein:
the time reference of the master count generator is derived from the alternating current generated external to the system.

42. A system in accordance with claim 33 wherein:
the time reference of each count generator of each generator control unit associated with the generator is produced by a reference clock which controls the frequency of alternating current generated by the generator and resetting of the count generator.

43. A system in accordance with claim 42 wherein:
the time reference of the count generator of each generator control unit is derived from the alternating current generated by the associated generator.

44. A method of at least phase locking alternating current generated by at least one alternating current generator with each generator having an associated generator control unit for controlling the generator to alternating current generated external to a generating system comprising:
periodically transmitting a synchronization count from a master control unit to each generator control unit in the system with the synchronization count varying from a minimum to a maximum during each cycle of the alternating current generated external to the generating system and being proportional to a phase of the alternating current generated external to the system with respect to a time reference;
each generator control unit associated with a generator generating a synchronization count which varies between the minimum and the maximum over each period of a cycle of alternating current generated by the generator controlled by the associated generator control unit; and
each generator control unit associated with a generator adjusting at least the phase of alternating current generated by the generator as a function of a difference between the received synchronization count and the synchronization count generated by the generator control unit to cause the alternating current generated by the generator to be locked at least in phase to the alternating current generated external to the generating system.

45. A method in accordance with claim 44 further comprising:
adjusting the frequency of alternating current generated by each generator as a function of the correction count to cause the alternating current generated external to the generating system and at least one generator and to be locked in frequency.

46. A method in accordance with claim 45 wherein:
the synchronization count is transmitted asynchronously with respect to a frequency of alternating current generated external to the system.

47. In an alternating current generating system having at least one slave generator with each slave generator being controlled by an associated slave generator control unit with alternating current generated by each slave generator being locked at least in phase to alternating current generated by a master generator controlled by a master generator control unit, the master generator control unit comprising:
a master count generator for generating a synchronization count varying from a minimum to a maximum during each cycle of alternating current generated by the master generator with the synchronization count being proportional at any time during a cycle of the generated alternating current to a phase of electrical current being generated by the master generator with respect to a time reference; and
means for generating the time reference.

48. A master control unit in accordance with claim 47 wherein:
the means for generating the time reference is a reference clock for producing output pulses on an output to the master unit generator defining the period of each cycle of the alternating current with the clock pulses also being applied to a frequency control which controls a frequency of the alternating current produced by the master generator.

49. In an alternating current generating system having at least one slave generator with each slave generator being controlled by an associated slave generator control unit with alternating current generated by each slave generator being locked at least in phase to alternating current generated by a master generator controlled by a master generator control unit, each slave generator control unit comprising:
a slave synchronization count generator for generating a synchronization count varying from a minimum to a maximum during each cycle of alternating current generated by the associated slave generator with the synchronization count of each slave count generator at any time during a cycle of alternating current generated by the associated slave generator being proportional to the phase of the generated alternating current measured with respect to a time reference; and means for generating the time reference.

50. A slave control unit in accordance with claim 49 wherein each slave generator control unit further comprises:

means for receiving a synchronization count transmitted from the master generator control unit which varies from a minimum to a maximum during each cycle of alternating current generated by the master generator with the synchronization count of the master generator control unit being proportional at any time during a cycle of the generated alternating current to a phase of electrical current being generated by the master generator with respect to a time reference and for generating an interrupt pulse in response to receipt of the synchronization count;

an enable input to which is applied the interrupt pulse to sample the synchronization count of the slave count generator, a clock input to which is applied clock pulses which are counted by the slave count generator, the pulses having a frequency higher than a frequency of the alternating current generated by the slave generator; and wherein each slave generator control unit has a processor for generating a correction count which is a function of a difference between the compared counts; and each slave generator control unit has a controller for adjusting at least the phase of the electrical current generated by the slave generator controlled by the slave generator control unit as a function of the correction count.

51. A slave control unit in accordance with claim 50 wherein:

the slave generator control unit controller also locks a frequency of alternating current generated by each slave generator to a frequency of the alternating current generated by the master generator.

* * * * *